United States Patent
Venkatesan

(10) Patent No.: US 10,210,724 B2
(45) Date of Patent: Feb. 19, 2019

(54) REAL-TIME PATTERNED HAPTIC EFFECT GENERATION USING VIBRATIONS

(71) Applicant: Immersion Corporation, San Jose, CA (US)

(72) Inventor: Srivatsav Venkatesan, Sunnyvale, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/634,288

(22) Filed: Jun. 27, 2017

(65) Prior Publication Data

US 2018/0005497 A1   Jan. 4, 2018

Related U.S. Application Data

(60) Provisional application No. 62/356,265, filed on Jun. 29, 2016.

(51) Int. Cl.
*G08B 6/00* (2006.01)
*H04L 25/49* (2006.01)

(52) U.S. Cl.
CPC ............ *G08B 6/00* (2013.01); *H04L 25/4902* (2013.01)

(58) Field of Classification Search
CPC ....... G08B 6/00; H04L 25/4902; H04L 67/38; G06F 3/016; G06F 3/011; G06F 3/0484; G06F 2203/013; G06F 2203/014; G06F 2203/015; A63F 2300/1037; A63F 2300/1018; A63F 13/285; A63F 13/60; A63F 13/25; A63F 13/22; A63F 13/23; G05B 2219/37396; H01H 2003/008; H01H 13/85

See application file for complete search history.

(56) References Cited

U.S. PATENT DOCUMENTS

| | | | |
|---|---|---|---|
| 6,864,877 B2 * | 3/2005 | Braun | G06F 3/016 345/156 |
| 7,088,224 B2 | 8/2006 | Nakagawa et al. | |
| 7,091,948 B2 * | 8/2006 | Chang | G06F 3/016 345/156 |
| 7,742,036 B2 * | 6/2010 | Grant | G06F 3/016 345/156 |
| 8,698,766 B2 * | 4/2014 | Ali | G06F 3/016 345/173 |
| 8,717,152 B2 * | 5/2014 | Bhatia | G06F 3/016 340/407.1 |
| 8,760,273 B2 * | 6/2014 | Casparian | G06F 3/016 200/521 |
| 8,981,682 B2 * | 3/2015 | Delson | A63F 13/06 318/114 |
| 9,164,587 B2 * | 10/2015 | Da Costa | A63F 13/23 |
| 9,213,408 B2 | 12/2015 | Gandhi et al. | |

(Continued)

FOREIGN PATENT DOCUMENTS

WO     WO2014112787 A1     7/2014

*Primary Examiner* — Thomas S McCormack
(74) *Attorney, Agent, or Firm* — Miles & Stockbridge P.C.

(57) ABSTRACT

One embodiment provides haptic functionality. The embodiment receives an encoded value that encodes an actuator drive value, where the actuator drive value corresponds to a strength of a haptic effect. The embodiment converts the encoded value into a pattern of ON/OFF durations, and plays back the pattern of ON/OFF durations on an actuator to produce the haptic effect.

20 Claims, 7 Drawing Sheets

(56) References Cited

U.S. PATENT DOCUMENTS

| | | | |
|---|---|---|---|
| 9,342,149 B2* | 5/2016 | Casparian | G06F 3/016 |
| 9,367,136 B2 | 6/2016 | Latta et al. | |
| 9,370,459 B2 | 6/2016 | Mahoney | |
| 9,370,704 B2 | 6/2016 | Marty | |
| 9,392,094 B2 | 7/2016 | Hunt et al. | |
| 9,448,626 B2* | 9/2016 | Cruz-Hernandez | G06F 3/016 |
| 9,462,262 B1 | 10/2016 | Worley, III et al. | |
| 9,608,848 B2* | 3/2017 | Roy | H04L 25/4902 |
| 9,626,805 B2 | 4/2017 | Lampotang et al. | |
| 9,645,646 B2 | 5/2017 | Cowley et al. | |
| 9,652,037 B2 | 5/2017 | Rubin et al. | |
| 9,697,706 B2* | 7/2017 | Barsilai | G08B 6/00 |
| 9,760,166 B2 | 9/2017 | Ammi et al. | |
| 9,811,854 B2 | 11/2017 | Lucido | |
| 9,851,799 B2 | 12/2017 | Keller et al. | |
| 9,933,851 B2 | 4/2018 | Goslin et al. | |
| 9,948,885 B2 | 4/2018 | Kurzweil | |
| 2007/0236449 A1 | 10/2007 | Lacroix et al. | |
| 2008/0062145 A1* | 3/2008 | Shahoian | G06F 1/1616 345/173 |
| 2008/0204266 A1* | 8/2008 | Malmberg | G06F 3/016 340/683 |
| 2012/0206246 A1 | 8/2012 | Cruz-Hernandez et al. | |
| 2015/0070269 A1 | 3/2015 | Bhatia et al. | |
| 2015/0130707 A1 | 5/2015 | Da Costa et al. | |
| 2016/0070348 A1 | 3/2016 | Cowley et al. | |
| 2016/0084605 A1 | 3/2016 | Monti | |
| 2016/0086457 A1 | 3/2016 | Baron et al. | |
| 2016/0139671 A1* | 5/2016 | Jun | G06F 3/016 715/702 |
| 2016/0163227 A1 | 6/2016 | Penake et al. | |
| 2016/0166930 A1 | 6/2016 | Brav et al. | |
| 2016/0169635 A1 | 6/2016 | Hannigan et al. | |
| 2016/0170508 A1 | 6/2016 | Moore et al. | |
| 2016/0171860 A1 | 6/2016 | Hannigan et al. | |
| 2016/0171908 A1 | 6/2016 | Moore et al. | |
| 2016/0187969 A1 | 6/2016 | Larsen et al. | |
| 2016/0187974 A1 | 6/2016 | Mallinson | |
| 2016/0201888 A1 | 7/2016 | Ackley et al. | |
| 2016/0209658 A1 | 7/2016 | Zalewski | |
| 2016/0214015 A1 | 7/2016 | Osman et al. | |
| 2016/0214016 A1 | 7/2016 | Stafford | |
| 2016/0239087 A1* | 8/2016 | Shih | G06F 1/1626 |
| 2016/0375170 A1 | 12/2016 | Kursula et al. | |
| 2017/0102771 A1 | 4/2017 | Lei | |
| 2017/0103574 A1 | 4/2017 | Faaborg et al. | |
| 2017/0131775 A1 | 5/2017 | Clements | |
| 2017/0148281 A1 | 5/2017 | Do et al. | |
| 2017/0154505 A1 | 6/2017 | Kim | |
| 2017/0168576 A1 | 6/2017 | Keller et al. | |
| 2017/0168773 A1 | 6/2017 | Keller et al. | |
| 2017/0178407 A1 | 6/2017 | Gaidar et al. | |
| 2017/0203221 A1 | 7/2017 | Goslin et al. | |
| 2017/0203225 A1 | 7/2017 | Goslin | |
| 2017/0206709 A1 | 7/2017 | Goslin et al. | |
| 2017/0214782 A1 | 7/2017 | Brinda | |
| 2017/0257270 A1 | 9/2017 | Goslin et al. | |
| 2017/0352185 A1 | 12/2017 | Bonilla Acevedo et al. | |
| 2018/0050267 A1 | 2/2018 | Jones | |
| 2018/0053351 A1 | 2/2018 | Anderson | |
| 2018/0077976 A1 | 3/2018 | Keller et al. | |
| 2018/0081436 A1 | 3/2018 | Keller et al. | |
| 2018/0093181 A1 | 4/2018 | Goslin et al. | |
| 2018/0107277 A1 | 4/2018 | Keller et al. | |
| 2018/0120936 A1 | 5/2018 | Keller et al. | |

* cited by examiner

REAL-TIME PATTERNED HAPTIC EFFECT GENERATION USING VIBRATIONS

CROSS REFERENCE TO RELATED APPLICATIONS

This application claims priority of U.S. Provisional Patent Application Ser. No. 62/356,265, filed on Jun. 29, 2016, the disclosure of which is hereby incorporated by reference.

FIELD

One embodiment is directed generally to a haptic system, and in particular, to a system that generates haptic effects.

BACKGROUND INFORMATION

Generally, electronic device manufacturers strive to produce a rich interface for users. Conventional devices use visual and auditory cues to provide feedback to a user, while in some interface devices, kinesthetic feedback, such as active and resistive force feedback, and/or tactile feedback, such as vibration, texture, and heat, is also provided to the user, more generally known collectively as "haptic feedback" or "haptic effects". Haptic feedback can provide cues that enhance and simplify the user interface. Specifically, vibration effects or vibrotactile haptic effects may be useful in providing cues to users of electronic devices to alert the user to specific events, or provide realistic feedback to create greater sensory immersion within a simulated or virtual environment.

Generally, a haptic effect developer can author a haptic effect for a device, and the device can be configured to output the haptic effect. Different types of hardware may be capable of generating different types of haptic effects due to different hardware characteristics. For example, different types of actuators such as eccentric rotating mass motor actuators, linear resonant actuators, and piezoelectric actuators are capable of generating different types of haptic effects due to different electromechanical characteristics of the different actuators.

Generally, some devices may implement an "ON/OFF" vibrate control such as the "Android" vibrate API from Google Corp. to control actuators. However, such devices may not have fine-grain control over the drive values and durations of the actuators. Therefore, there is a need for providing fine-grain control over the drive values and durations of the actuators on devices that rely on an "ON/OFF" vibrate control.

SUMMARY

One embodiment is a system that provides haptic functionality. The system receives an encoded value that encodes an actuator drive value, where the actuator drive value corresponds to a strength of a haptic effect. The system converts the encoded value into a pattern of ON/OFF durations, and plays back the pattern of ON/OFF durations on an actuator to produce the haptic effect.

DETAILED DESCRIPTION

One embodiment is a system that can automatically generate haptic effects given source data such as audio or video source data or any sensory data related to the content of a multimedia clip (e.g., acceleration of objects, rotations, speeds, etc.). Embodiments generate haptic effects by translating source data into vibrate patterns so that the haptic effects can be effectively generated using pulse width modulated (i.e., ON/OFF) signals that are applied to an actuator.

Figure 1:
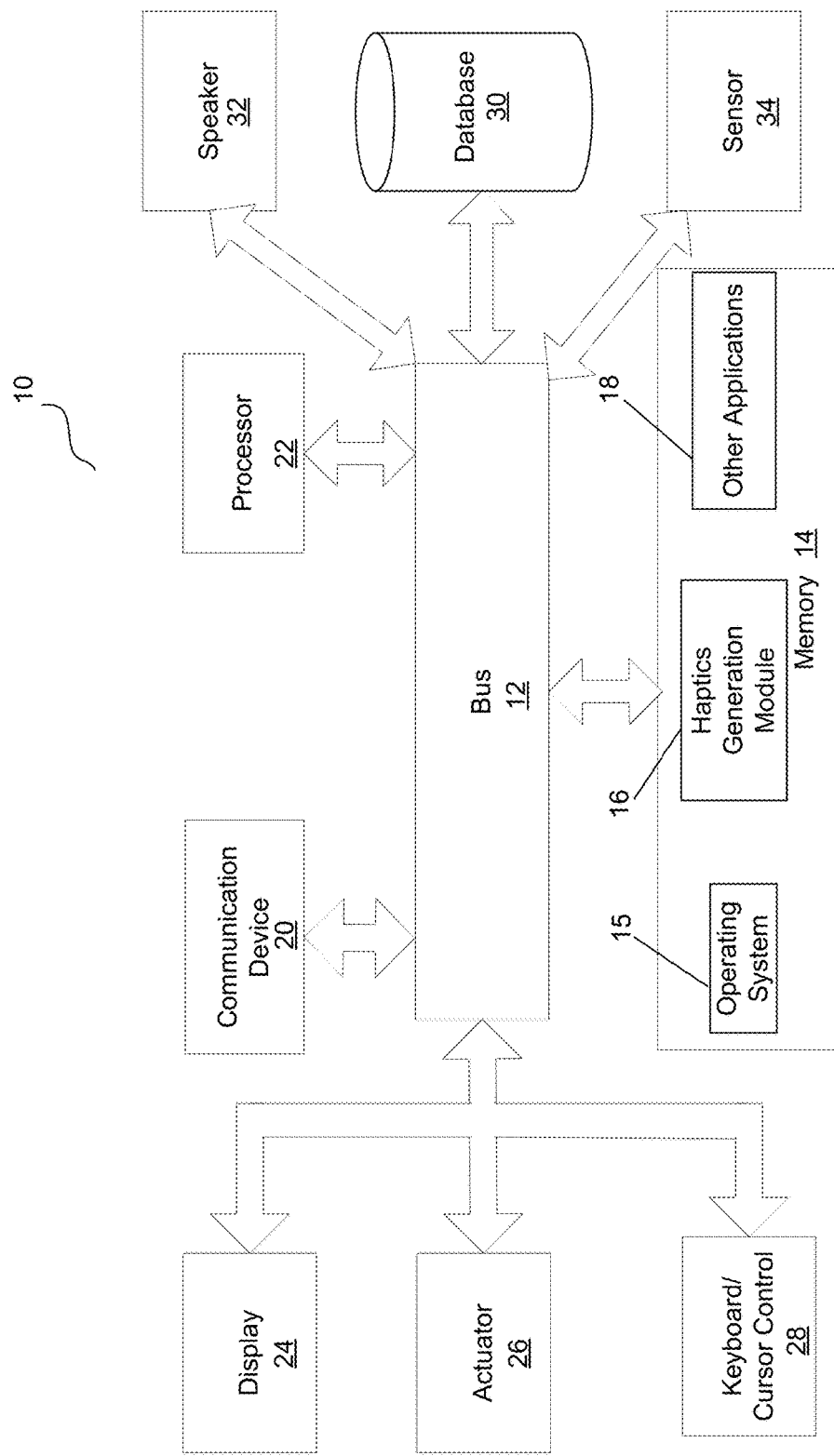
FIG. 1 is a block diagram of a computer server/system in accordance with an embodiment of the present invention.

FIG. 1 illustrates a block diagram of a system 10 in accordance with one embodiment of the invention. In one embodiment, system 10 is part of a device and provides real-time haptics generation functionality for the device. In another embodiment, system 10 is separate from the device, and remotely provides the real-time haptics generation functionality for the device.

Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 may include any combination of random access memory ("RAM"), read only memory ("ROM"), static storage such as a magnetic or optical disk, or any other type of transitory or non-transitory computer-readable medium.

A computer-readable medium may be any available transitory or non-transitory medium that can be accessed by processor 22 and may include both a volatile and non-volatile medium, a removable and non-removable medium, a communication medium, and a storage medium. A communication medium may include computer-readable instructions, data structures, program modules, or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disks, removable disks, compact disk read-only memory ("CD-ROM"), or any other form of a storage medium known in the art.

In one embodiment, memory 14 stores software modules that provide functionality when executed by processor 22. The modules include an operating system 15 that provides operating system functionality for system 10, as well as the rest of a device in one embodiment. The modules further include a haptics generation module 16 that generates haptic effects using signals modulated according to pulse-width modulation ("PWM"), as disclosed in more detail herein. PWM is a modulation technique used to encode a message into a pulsing signal. PWM may be used to control the power supplied to electrical devices, where the average value of voltage (and current) fed to a load is controlled by turning a virtual or physical switch between a supply and a load on and off at a fast rate. The longer the switch is on compared to the off periods, the higher the total power supplied to the load.

In one embodiment, haptics generation module 16 can comprise a plurality of modules, where each individual module provides specific individual functionality for generating haptic effects. System 10 will typically include one or more additional application modules 18 to include additional functionality, such as a Vibrate application programming interface ("API") that is part of an operating system of a smartphone.

In one embodiment, system 10 may transmit and/or receive data from remote sources and may further include a communication device 20, such as a network interface card, to provide mobile wireless network communication, such as infrared, radio, Wi-Fi, cellular network communication, etc. In one embodiment, communication device 20 may provide a wired network connection, such as an Ethernet connection, a modem, etc.

Processor 22 is further coupled via bus 12 to a display 24, such as a Liquid Crystal Display ("LCD"), for displaying a graphical representation or user interface to a user. Display 24 may be a touch-sensitive input device, such as a touchscreen, configured to send and receive signals to/from processor 22, and may be a multi-touch touchscreen. Processor 22 may be further coupled to a keyboard or cursor control 28 that allows a user to interact with system 10, such as a mouse or a stylus.

In one embodiment, system 10 further includes an actuator 26. Processor 22 may transmit a haptic signal associated with a generated haptic effect to actuator 26, which in turn outputs haptic effects such as vibrotactile haptic effects, electrostatic friction haptic effects, or deformation haptic effects. Actuator 26 includes an actuator drive circuit. Actuator 26 may be, for example, an electric motor, an electromagnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, an electroactive polymer ("EAP") actuator, an electrostatic friction display, or an ultrasonic vibration generator. In alternate embodiments, system 10 can include one or more additional actuators, in addition to actuator 26 (not illustrated in FIG. 1).

Actuator 26 is an example of a haptic output device, where a haptic output device is a device configured to output haptic effects, such as vibrotactile haptic effects, electrostatic friction haptic effects, or deformation haptic effects, in response to a drive signal. In alternate embodiments, actuator 26 can be replaced by some other type of haptic output device. Further, in other alternate embodiments, system 10 may not include actuator 26, and a separate device from system 10 includes an actuator, or other haptic output device, that generates the haptic effects, and system 10 sends generated haptic effect signals to that device through communication device 20.

System 10 can further be operatively coupled to a database 30, where database 30 can be configured to store data used by modules 16 and 18. Database 30 can be an operational database, an analytical database, a data warehouse, a distributed database, an end-user database, an external database, a navigational database, an in-memory database, a document-oriented database, a real-time database, a relational database, an object-oriented database, or any other database known in the art.

In one embodiment, system 10 further includes a speaker 32. Processor 22 may transmit an audio signal to speaker 32, which in turn outputs audio effects. Speaker 32 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, a digital loudspeaker, etc. In alternate embodiments, system 10 may include one or more additional speakers, in addition to speaker 32 (not illustrated in FIG. 1). Further, in other alternate embodiments, system 10 may not include speaker 32, and a separate device from system 10 includes a speaker that outputs the audio effects, and system 10 sends audio signals to that device through communication device 20.

In one embodiment, system 10 further includes a sensor 34. Sensor 34 may be configured to detect a form of energy, or other physical property, such as, but not limited to, sound, movement, acceleration, biological signals, distance, flow, force/pressure/strain/bend, humidity, linear position, orientation/inclination, radio frequency, rotary position, rotary velocity, manipulation of a switch, temperature, vibration, visible light intensity, etc. Sensor 34 may further be configured to convert the detected energy, or other physical property, into an electrical signal, or any signal that represents virtual sensor information. Sensor 34 may be any device, such as, but not limited to, an accelerometer, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gauge, a hygrometer, a linear position touch sensor, a linear potentiometer (or slider), a linear variable differential transformer, a compass, an inclinometer, a magnetic tag (or a radio frequency identification ("RFID") tag), a rotary encoder, a rotary potentiometer, a gyroscope, an on-off switch, a temperature sensor (such as a thermometer, thermocouple, resistance temperature detector, thermistor, temperature-transducing integrated circuit, etc.), a microphone, a photometer, an altimeter, a biological monitor, a camera, a light-dependent resistor, etc., or any device that outputs an electrocardiogram, an electroencephalogram, an electromyograph, an electrooculogram, an electropalatograph, or any other electrophysiological output.

In one embodiment, system 10 may include one or more additional sensors, in addition to sensor 34 (not illustrated in FIG. 1). In one embodiment, sensor 34 and the one or more additional sensors may be part of a sensor array, or some other type of collection/arrangement of sensors. In one embodiment, system 10 may not include sensor 34, and a separate device from system 10 includes a sensor that detects a form of energy, or other physical property, and converts the detected energy, or other physical property, into an electrical signal, or other type of signal that represents virtual sensor information. The device may then send the converted signal to system 10 through communication device 20.

One embodiment of the present invention implements PWM functionality together with ON/OFF vibrate control to provide fine-grain control over the drive values and durations on actuators. The embodiment provides an algorithm for using an ON/OFF vibrate control to deliver high quality haptics. In one embodiment, a haptic effect designer's intended haptic strength is translated into vibrate patterns and haptics rendered on an actuator.

In one embodiment, if the operating system of a device executes a function that only allows for ON/OFF control of an actuator and does not allow for controlling the strength of the drive signal of the actuator, the embodiment configures the ON/OFF control to deliver high quality haptic effects. For example, one embodiment may use the Android vibrate API that is a part of the "Vibrator" class that operates the vibrator on an Android device. Table 1 provides example public methods exposed by this class. As shown in the example of Table 1, the Android vibrate API does not control the drive value of the actuator, and the only parameter that can be controlled is the duration. When this API is called with a specified duration, the actuator will be turned on with the maximum drive value of the duration specified in the call.

TABLE 1

Example public methods exposed by the "Vibrate" class

| | |
|---|---|
| abstract | cancel( ) |
| void | Turn the vibrator off |
| abstract | hasVibrator( ) |
| boolean | Check whether the hardware has a vibrator |
| void | vibrate(long[ ] pattern, int repeat, AudioAttributes attributes) |
| | Vibrate with a given pattern |
| void | vibrate(long[ ] pattern, int repeat) |
| | Vibrate with a given pattern |
| void | vibrate(long milliseconds) |
| | Vibrate constantly for the specified period of time |
| void | vibrate(long milliseconds, AudioAttributes attributes) |
| | Vibrate constantly for the specified period of time |

One embodiment uses the Android Vibrate API to render haptic signals of varying strengths by implementing fine-grain control of actuator activation duration and synchronization. The embodiment provides real-time haptics functionality using a pulse with a pulse period (or pulse duration) that may be obtained by experimentation (e.g., offline experimentation on a certain actuator). The desired haptic strength is rendered by modulating the duty cycle of the pulse which is generally defined as:

Duty Cycle=Pulse Width×100/Pulse Period

Figure 2:
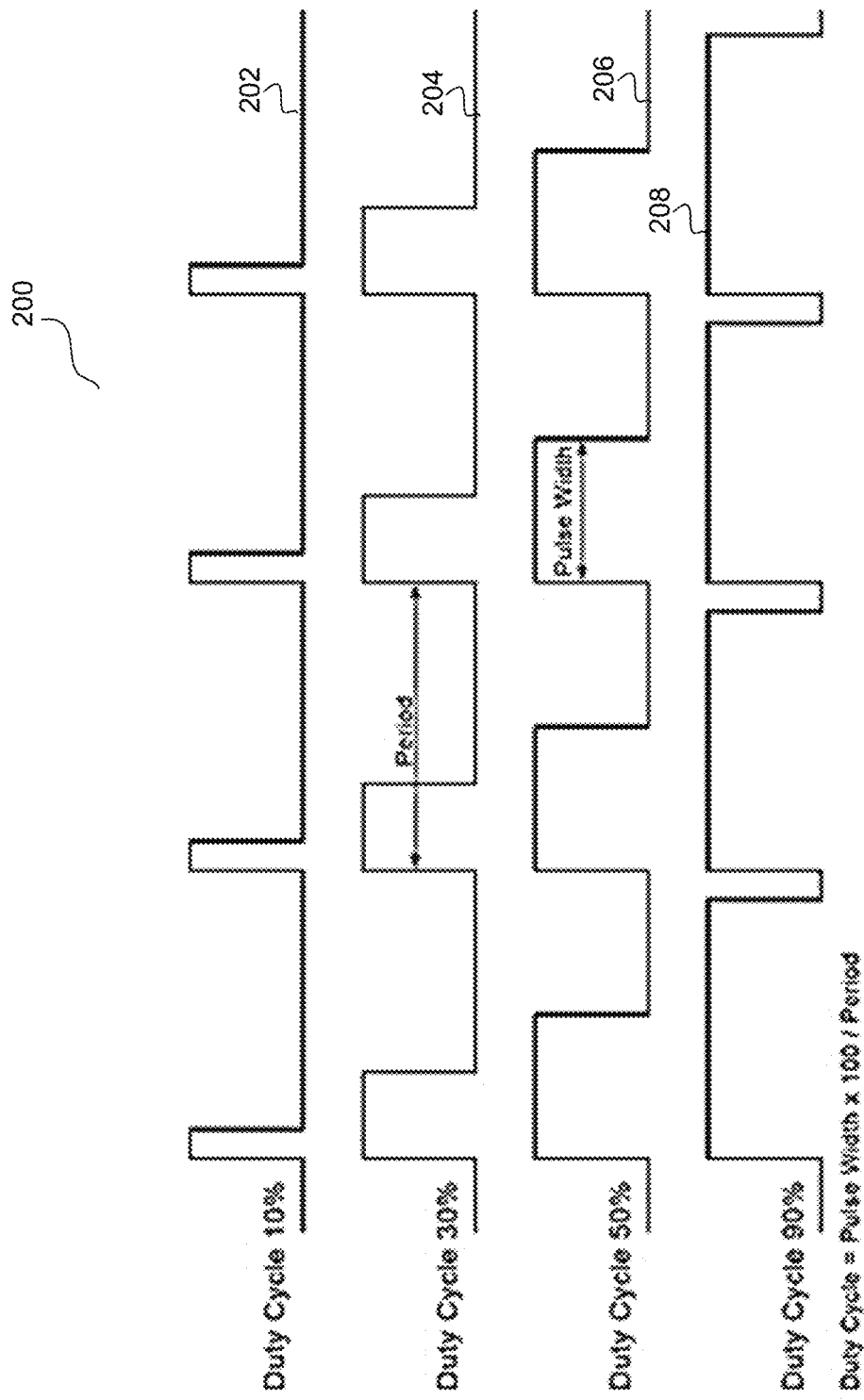
FIG. 2 illustrates example graphs of pulses with the same pulse period but with different duty cycles.

The duty cycle may be modulated by changing the pulse width (or "ON" duration) of the pulse. FIG. 2 illustrates example graphs 200 of pulses with the same period but with different duty cycles, where a first pulse 202 has a 10% duty cycle, a second pulse 204 has a 30% duty cycle, a third pulse 206 has a 50% duty cycle, and a fifth pulse 208 has a 90% duty cycle. In one embodiment, the frequency of the pulses (which is the inverse of the pulse period) is configured based on the type of the actuator and is kept constant, while the duty cycle is varied to control the strength of the rendered haptic effects as perceived. In one embodiment, the perceived strength is directly proportional to the duty cycle of the pulses. That is, a pulse with a 20% duty cycle is perceived as being twice as strong as a pulse with a 10% duty cycle. By properly modulating the duty cycle, embodiments modulate the perceived strength, thereby playing various haptic effects.

One embodiment, for example, modulates the pulse width of the drive signal applied to a coin ERM actuator. In one embodiment, for a coin ERM actuator, the frequency of the pulse is determined based on experimentation suggesting that the maximum time period of the pulse needs to be less than 32 milliseconds, and the lower the time period, the better the haptic fidelity. Accordingly, the embodiment may configure the pulse period at 32 milliseconds. To achieve maximum haptic strength, the embodiment sets the duty cycle to 100% where the actuator will always be on until the actuator is requested to be turned off. To achieve a 50% haptic strength, the embodiment sets the duty cycle to 50% where the actuator will be on for 16 milliseconds and off for 16 milliseconds. The pulses will be applied repeatedly until the actuator is requested to be turned off. To achieve a 25% haptic strength, the embodiment sets the duty cycle to 25% where the actuator will be on for 8 milliseconds and off for 24 milliseconds. The pulses will be applied repeatedly until the actuator is requested to be turned off.

One embodiment provides real-time haptics modification functionality by implementing an encoder, a pattern converter, and a pattern playback module as described in detail below. In one embodiment, the encoder may reside in a media application/driver (e.g., a design tool) on a workstation (e.g., a MAC or PC machine), while the pattern converter and the pattern playback module reside on a device such as an Android device. In this embodiment, the workstation may send encoded values to the playback device via any known means in the art such as a universal serial bus ("USB") connection. In one embodiment, for example, a user may be designing a haptic effect using any audio editing tool known in the art such as the "Pro Tools" from Avid Technology Corp. In one embodiment, a plugin to the audio editing tool may generate drive values, or an additional driver may receive the audio data from the audio editing tool and convert it to drive values (e.g., by performing down-sampling, peak detection, etc.). In this embodiment, the output of the plugin/driver is the duty cycle value (ON duration of the pulse) of the PWM output signal, which is the drive value input to the encoder.

Figure 3:
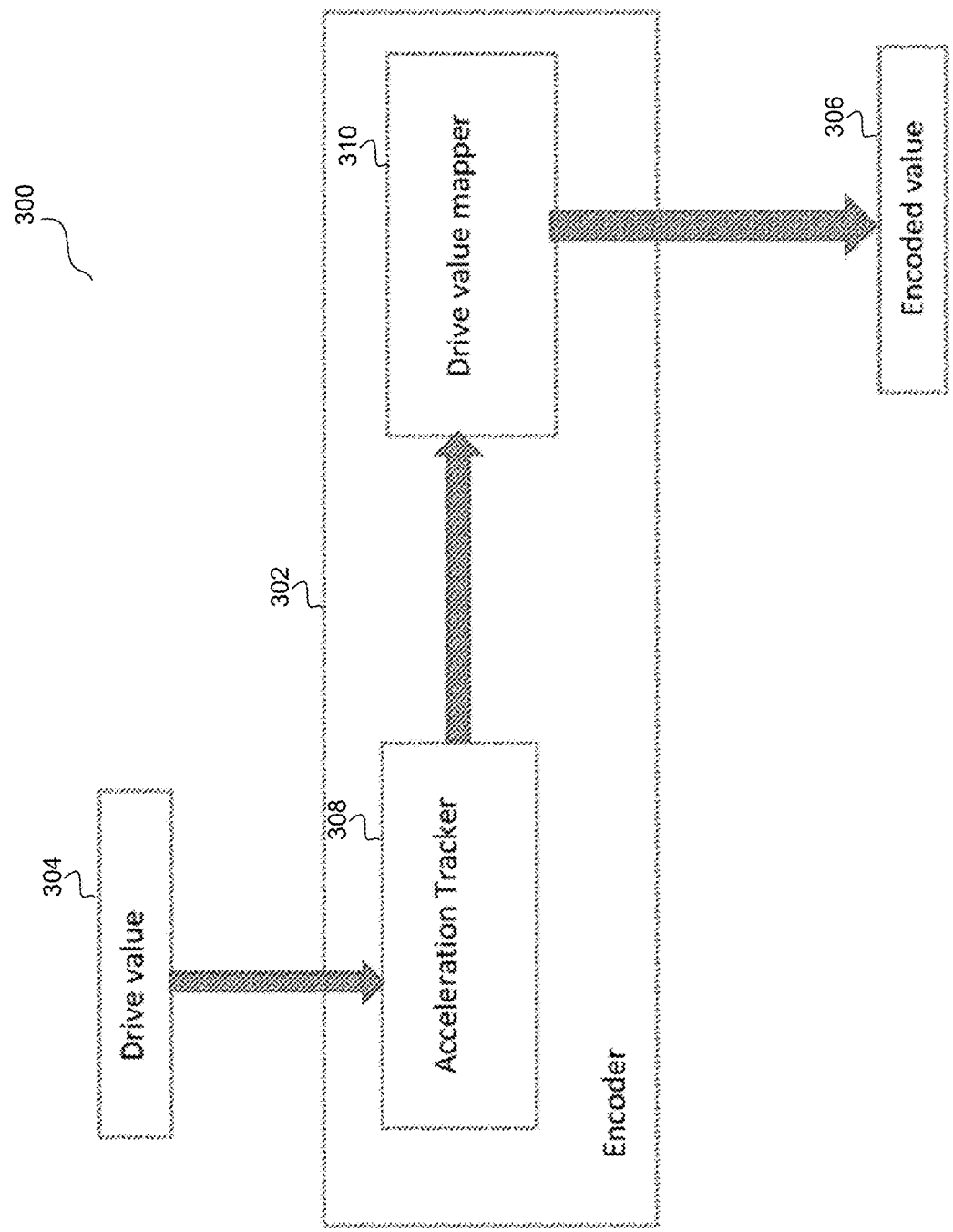
FIG. 3 is an example block diagram illustrating the functionality of an encoder in one embodiment.

FIG. 3 is an example block diagram 300 illustrating the functionality of an encoder 302 in one embodiment. Encoder 302 converts a haptic drive value 304 to an encoded value 306. Drive value 304 is configured to control the strength of a haptic playback. Drive value 304 may be obtained by any haptic conversion algorithm that is known to one of ordinary skill in the relevant art to convert an input signal into a haptic signal. In one embodiment, drive value 304 may be obtained from a haptic file source such as an audio file in an editing software that performs audio-to-haptic conversion to obtain drive value 304. For example, drive value 304 may be derived in one embodiment from the conversion of an audio signal to a haptic signal using peak detection as disclosed in U.S. Pat. Pub. No. 2015/0070269, which is herein incorporated by reference.

For example, one embodiment implements a peak-detection haptic conversion algorithm that identifies a maximum amplitude value for each portion of an input signal, and generates a haptic signal for each portion of the input signal based on the identified maximum amplitude value, where the identified maximum amplitude value defines a magnitude of the haptic signal. As another example, one embodiment implements a low-pass filter haptic conversion algorithm that filters out a portion of the input signal (e.g., a portion of the input signal with the highest frequency values), and generates a haptic signal based on the remaining portion of the input signal. As yet another example, one embodiment implements a high-pass filter haptic conversion algorithm that filters out a portion of the input signal (e.g., a portion of the input signal with the lowest frequency values), and generates a haptic signal based on the remaining portion of the input signal. As yet another example, one embodiment implements a pitch-shift haptic conversion algorithm that shifts a pitch of at least a portion of an input signal, and generates a haptic signal based on the pitch-shifted input signal. As yet another example, one embodiment implements a frequency-shift haptic conversion algorithm that shifts a frequency of at least a portion of an input signal, and generates a haptic signal based on the frequency-shifted input signal.

In one embodiment, drive value 304 may be received in the form of a parameterized vibration definition that defines the envelope/shape of haptic effect. The definition may include parameters that define the haptic effect, including duration, frequency, magnitude, etc. In one embodiment, the definition is in accordance with the "TouchSense® 3000 Haptic Design Kit" from Immersion Corp. In this embodiment, the haptic effect is defined by a definition shape formed by an envelope that includes three basis parts/regions or effect magnitudes: impulse, sustain, and fade that are formed from a MagSweep or Periodic basis effect.

In one embodiment, encoder 302 is configured to receive discrete drive values 304 in a range such as [128, 255]. In this embodiment, a drive value of 128 is configured to deliver zero haptic strength. The haptic strength increases with the drive value, and a drive value of 255 is configured to produce a maximum haptic strength.

Encoder 302 includes an acceleration tracker 308 and a drive value mapper 310. Acceleration tracker 308 uses a table of a motor's performance (e.g., rise and fall curves) to predict and track an estimated acceleration of an actuator in real-time. It implements a feed-forward algorithm configured to enable the actuator to reach the desired strength quickly. It does so by overdriving the actuator (e.g., operating the actuator at maximum voltage) for a short duration. The overdrive duration is a function of the actuator rise time and a requested haptic strength (as indicated by drive value 304). Example embodiments of acceleration tracker 308 and the corresponding feed-forward algorithm are disclosed in U.S. Pat. No. 9,213,408, which is herein incorporated by reference.

For example, in order to model slow actuators that generally have non-linear rise and fall characteristics, embodiments measure the total rise time taken for the actuator to rise from rest to 90% of rated acceleration. This rise time region in one embodiment is then divided into 10 segments at 10%, 20% . . . , 90% of the rise time, and the corresponding acceleration at each point is noted. Similarly to the rise curve, 10 values are obtained for the fall curve in one embodiment, although any number of values can be used. The fall time is considered to be the time required for an actuator to go from rated acceleration to below perceptible acceleration (~0.04 g in one embodiment). If braking is supported by the actuator, a negative overdrive voltage, or some other braking mechanism such as shunting, is applied. Otherwise, no voltage is applied. By applying this tuning model, embodiments have a more accurate picture of which effects a motor can play and also of the state of the motor at a given time.

In one embodiment, the functionality of acceleration tracker 308 is executed on every timer tick/cycle, which is typically 5 milliseconds. On each tick, embodiments determine the desired force and calculate the new force/voltage to send to the actuator (i.e., overdriving or braking partially to get the motor to spin at a desired speed). Embodiments determine how fast the motor should spin based on the haptic effect compared to how fast the motor can spin by taking into account an estimate of what the motor is currently doing in connection with where the actuator lies on it rise or fall curve. Embodiments compute a voltage that will get the motor to spin as closely as possible to the desired speed, and then update/re-compute the estimated speed, which might not be the same as the desired speed if the motor is incapable of reaching the desired speed in a timer tick.

In one embodiment, for example, the rise and fall curves of the actuator are divided into 10 linear segments based on the changes to the tuning process. The maximum increase/decrease in force values in a timer tick is determined, based on the slope of these line segments. The slope is used to determine if the actuator can get to the desired force value by the next timer tick. If not, a kick or brake pulse is applied. If the actuator can get to the desired force by the next time tick, the amount that the force should be increased/decreased is determined so that the actuator is at the desired force value by the end of the timer tick. The estimate force is updated on every tick.

In one embodiment, once an actuator is tested to obtain response-time curves/tables indicating how long it takes the actuator to rise/fall to various acceleration points, assuming that a current actuator follows the curve of the tested actuator, the recorded curves/tables are used in real-time to extract data and estimate what the actuator acceleration should be at any point in time. The embodiment may estimate, for example, how much time it takes the actuator to reach the maximum actuation and how much time it takes the actuator to go from maximum actuation to the rest condition. Based on these values, acceleration tracker 308 tracks the current acceleration state periodically (e.g., every millisecond or every five milliseconds), estimates how much acceleration the actuator has, and queues modified drive values accordingly in order to get the actuator to respond fast, for example, by applying an overdrive voltage (e.g., drive the actuator at maximum voltage, which is to keep the actuator on for a particular overdrive duration). As such, acceleration tracker 308 generates modified drive values based on drive value 304.

Drive value mapper 310 then receives the modified drive values from acceleration tracker 308 and maps them to encoded values 306 that are the duty factors indicating the "ON" duration in the pulse, for example, as disclosed herein with reference to FIG. 2.

Figure 4:
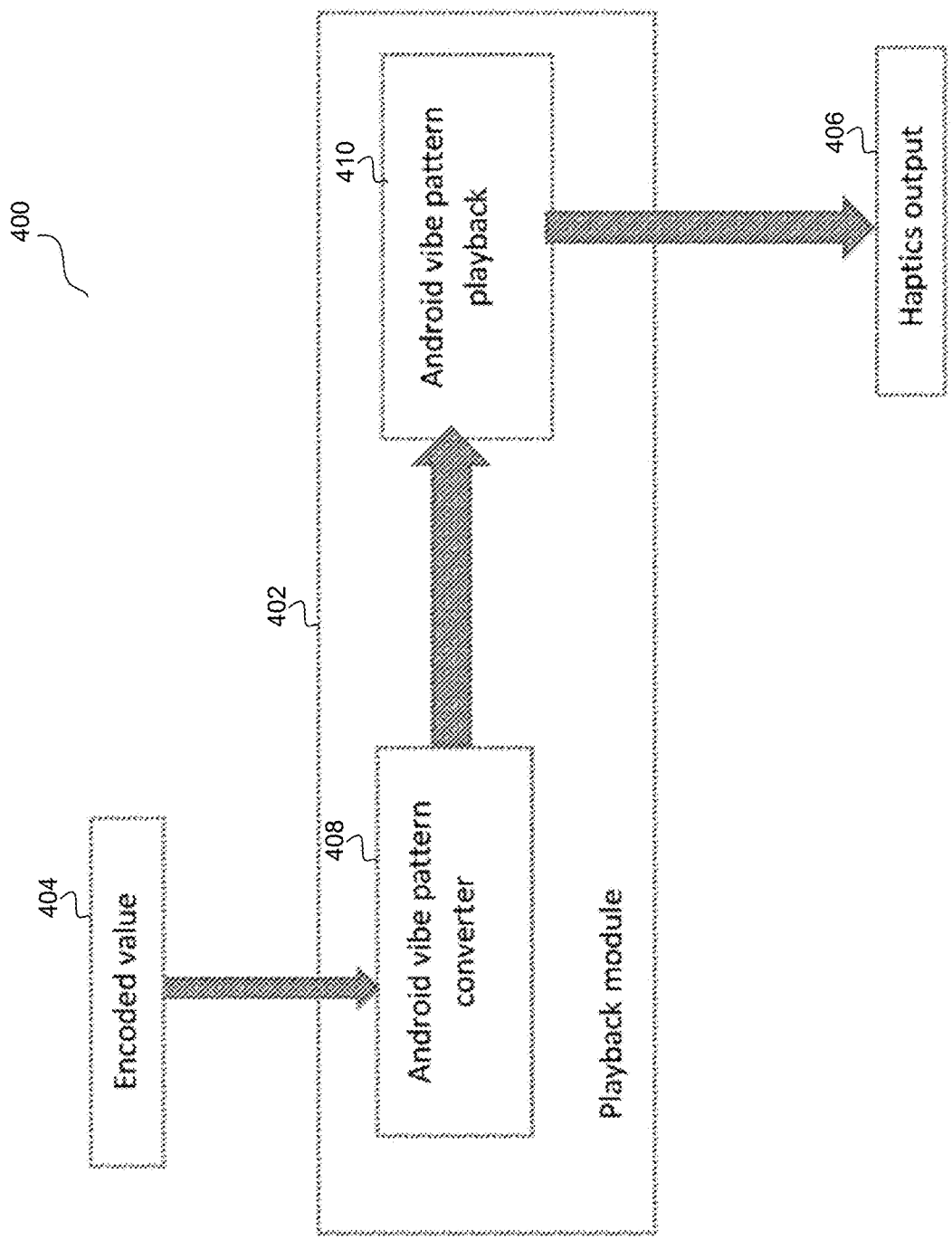
FIG. 4 is an example block diagram illustrating the functionality of a playback module in one embodiment.

FIG. 4 is an example block diagram 400 illustrating the functionality of a playback module 402 in one embodiment. Playback module 402 receives encoded values 404 (e.g., an array of values) and converts them into a haptic output 406 as described in detail below. In one embodiment, playback module 402 includes an Android vibe pattern converter 408 and an Android vibe pattern playback module 410 configured to execute in an Android device as described in detail below. However, other alternative embodiments may implement pattern converters and pattern playback modules configured to execute in other devices to convert encoded values 404 into a suitable ON/OFF pattern and play them back on an actuator, by providing similar functionalities as that of Android vibe pattern converter 408 and Android vibe pattern playback module 410, respectively.

Generally, the Android vibrate API is a public API that requires input in the form of ON/OFF patterns. In order to call this API from within playback module 402, playback module 402 implements Android vibe pattern converter 408 and Android vibe pattern playback module 410. Android vibe pattern converter 408 receives input as an array of encoded values 404 and implements a state machine to track the actuator states. Android vibe pattern converter 408 tracks and updates the state machine and outputs a vibration pattern suitable as input for the Android public API. Android vibe pattern playback module 410 receives the output from Android vibe pattern converter 408 and calls the public API of Android with these parameters. In one embodiment, Android vibe pattern converter 408 and Android vibe pattern playback module 410 become active as soon as encoded values 404 are received by playback module 402.

In one embodiment, the state machine implemented by Android vibe pattern converter 408 tracks the following parameters:

Actuator ON time ("act_on_time"): The time for which the actuator needs to stay on Actuator OFF time ("act_off_time"): The time for which the actuator needs to stay off. It is the difference between the duration of the pulse and the actuator ON time Actuator active time ("act_active_time"): The time for which the actuator is active in its current state Actuator current state ("act_state"): ON or OFF In one embodiment, encoded values 404 are received from the encoder by a "Write_value" function in Android vibe pattern converter 408. An encoded value indicates the time for which the actuator needs to stay on in a pulse. The encoded value is copied to the "act_on_time" parameter and the "act_off_time" parameter takes the value of:

act_off_time=pulse width−act_on_time

The "act_state" value remains unchanged except for the following conditions:

If the previous encoded value is less than the current encoded value and the current state of the actuator is OFF, the actuator state is changed to ON and the "act_active_time" parameter is reset.

If the previous encoded value is greater than the current encoded value and the current state of actuator is ON, the actuator state is changed to OFF and the "act_active_time" parameter is reset.

Every millisecond, a function "Update" is called. Once called, "Update" updates/increments the "act_active_time" parameter, compares the "act_active_time" parameter to the required state time, and modifies the state if required. For example, if the actuator is currently in ON state, every millisecond the "act_active_time" is incremented and compared to "act_on_time". If the "act_active_time" is greater than "act_on_time", the "act_active_time" is reset and the state is modified to OFF. The next time when the update function executes, the "act_active_time" is tracked and compared against "act_off_time".

In one embodiment, each encoded value 404 is configured for an update "tick" of the actuator drive value. For example, for some actuators, the update tick is 5 milliseconds, meaning the actuator drive value is updated every 5 milliseconds. Accordingly, the "Update" function may be called several times for each encoded value 404. For example, if the encoded value is configured for 5 milliseconds, the "Update" function is called 5 times for each encoded value. During each call to the "Update" function, the state is continuously monitored. If the state changes, the state times are recorded. The state times are populated in the format expected by the Android vibrate function. The pattern is populated as an "OFF_DURATION_MILLISEC, ON_DURATION_MILLISEC, OFF_DURATION_MILLISEC, ON_DURATION_MILLISEC . . . " pattern where "OFF_DURATION_MILLISEC" is the duration for which the actuator is turned off and "ON_DURATION_MILLISEC" is the duration for which the actuator is turned on. Android vibe pattern playback module 410 then takes the output from Android vibe pattern converter 408 and calls the Android vibrate API function, which in turn activates the actuator accordingly.

In one embodiment, the PWM technique works best on slower actuators (e.g., ERM) but it can work on faster actuators too by configuring various haptics functionalities differently depending on the capabilities of the actuators. For example, haptics functionality may be configured for faster actuators by adjusting the pulse width parameter in the embodiments such that the pulse width of the pulse used for faster actuators is lower compared to the pulse width of the pulse used for slower actuators.

Figure 5:
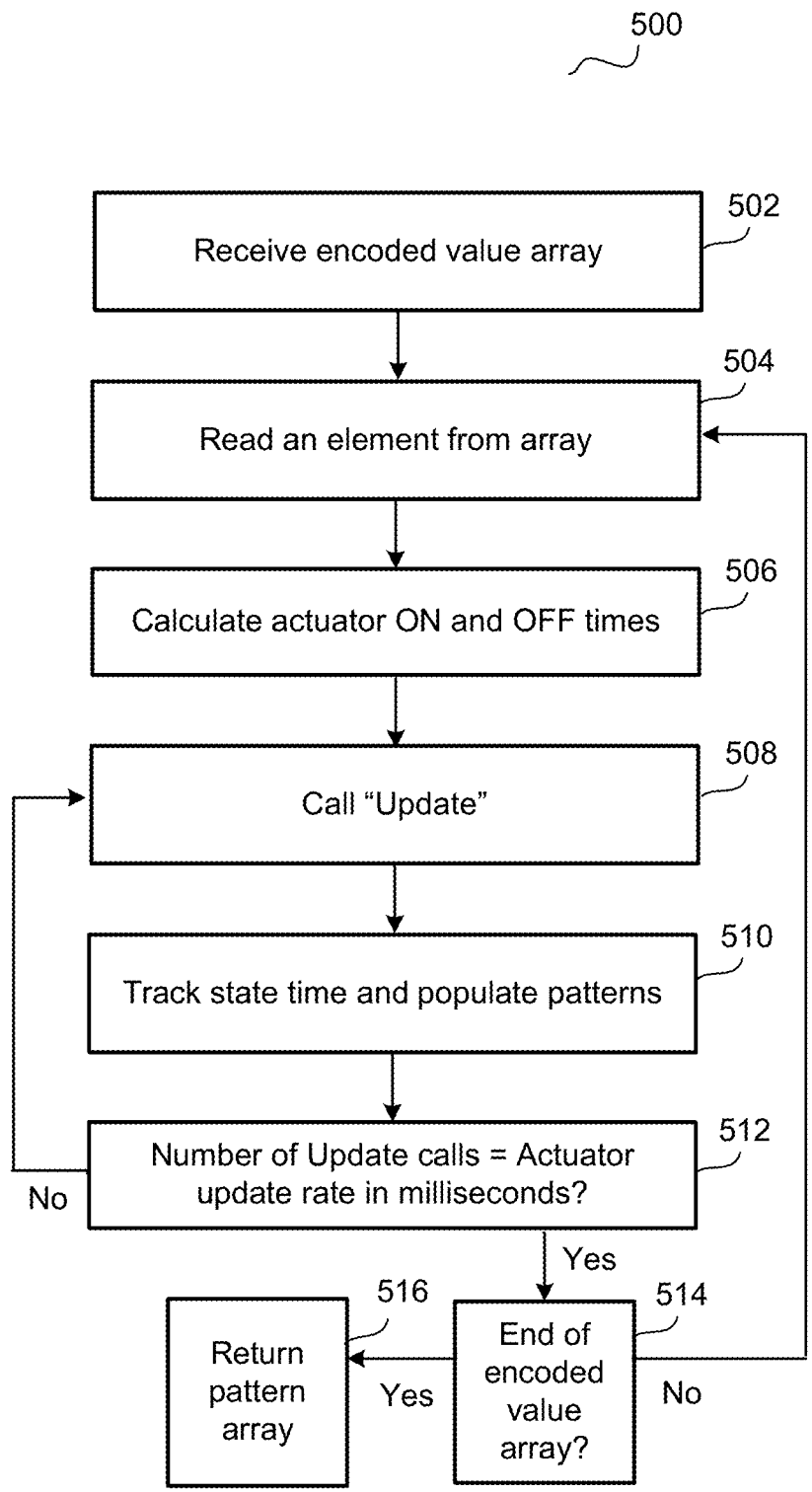
FIGS. 5-7 are example flow diagrams of the operation of the haptics generation module of FIG. 1 when performing haptic functionality in accordance with embodiments of the present invention.
Figure 6:
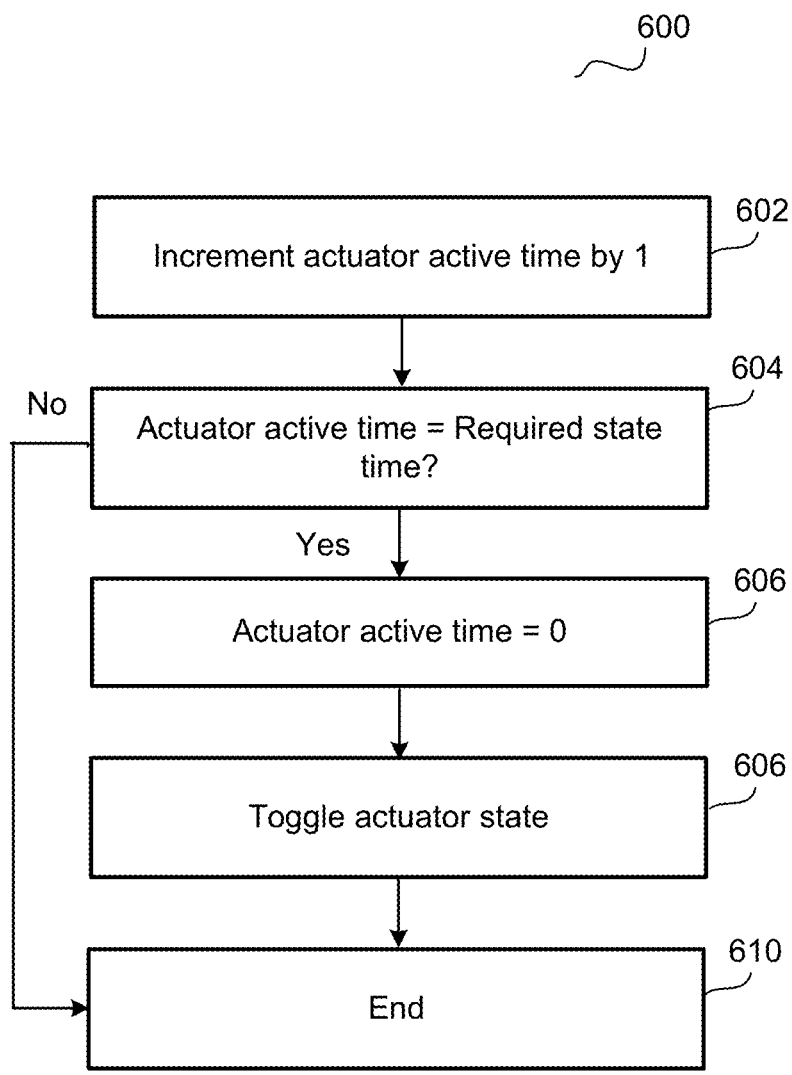
Figure 7:
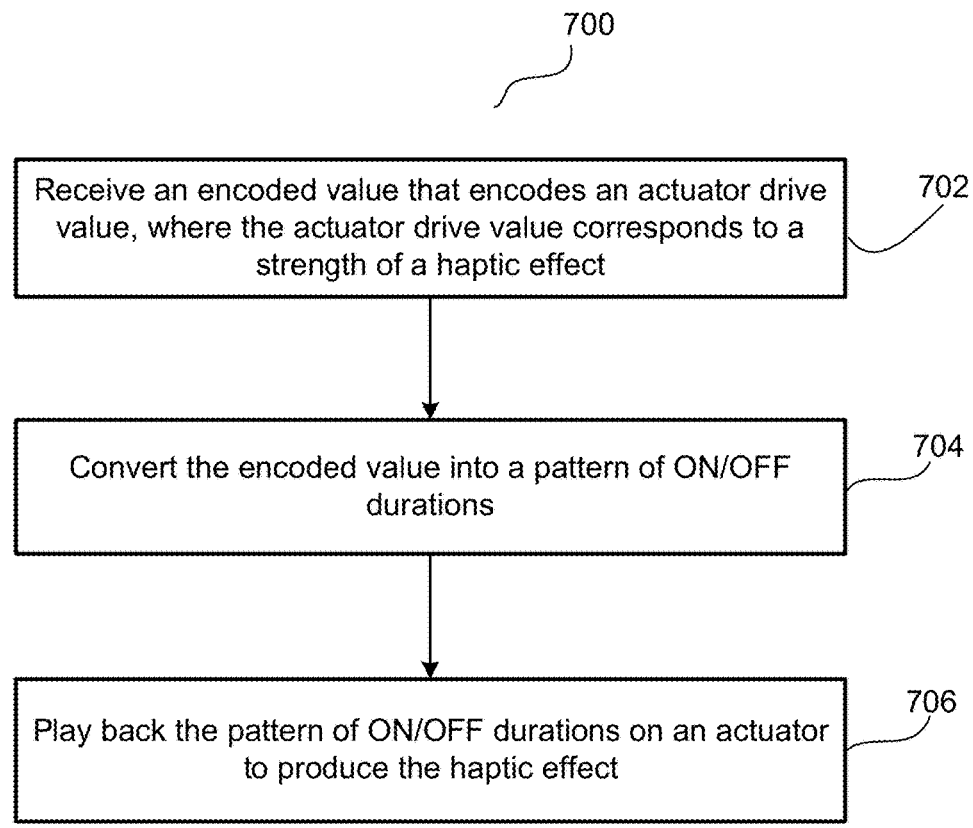

FIGS. 5-7 are flow diagrams 500, 600, 700 of haptic functionality in accordance with embodiments of the present invention. In one embodiment, the functionality of flow diagrams 500, 600, 700 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

More specifically, FIG. 5 illustrates the functionality of playback module 402 in one embodiment and is described below with reference to the elements of block diagram 400. Playback module 402 may be the same as, included within, or provided in addition to haptics generation module 16 in system 10 of FIG. 1 in one embodiment.

At 502 Android vibe pattern converter 408 within playback module 402 receives an array of encoded values 404. At 504 Android vibe pattern converter 408 reads an element from the array. At 506 Android vibe pattern converter 408 calculates actuator "ON" time and "OFF" time values based on the element of the array.

At 508 Android vibe pattern converter 408 calls the "Update" function. The functionality of "Update" function is as described in detail herein. At 510 Android vibe pattern converter 408 tracks actuator states and populates the resulting patterns. At 512 Android vibe pattern converter 408 determines if the number of calls to the "Update" function has reached the actuator update rate in milliseconds. If not, Android vibe pattern converter 408 loops back to 508. If the number of calls to the "Update" function has reached the actuator update rate in milliseconds, Android vibe pattern converter 408 determines if the end of the array of encoded values is reached. If not, Android vibe pattern converter 408 loops back to 504. If the end of the array of encoded values is reached, Android vibe pattern converter 408 returns the determined array of patterns.

FIG. 6 illustrates the functionality of the "Update" function in one embodiment. At 602 actuator active time is incremented by "1". At 604 it is determined whether actuator active time has reached the required state time. If not, the process ends at 610. If actuator active time has reached the required state time, at 606 actuator active time is resent to zero, at 606 actuator state is toggled, and at 610 the process ends.

In the functionality of FIG. 7, at 702 an encoded value that encodes an actuator drive value is received, where the actuator drive value corresponds to a strength of a haptic effect. At 704 the encoded value is converted into a pattern of ON/OFF durations, and at 706 the pattern of ON/OFF durations is played back on an actuator to produce the haptic effect.

In one embodiment, the actuator drive value is provided by a design tool on a workstation, the encoded value is obtained at the workstation, and the converting and the playing back are performed in a device that communicates with the workstation and operates the actuator.

In one embodiment, the encoded value is obtained by using the actuator drive value to modulate a pulse width of a pulse, and the encoded value is indicative of an actuator ON duration. In one embodiment, a pulse period of the pulse is selected according to characteristics of the actuator. In one embodiment, a pulse period of the pulse is determined by experimentation.

In one embodiment, the playing back is performed by providing the pattern of ON/OFF durations to an Android vibrate API.

In one embodiment, the converting of the encoded value into the pattern of ON/OFF durations is performed by implementing a state machine that tracks actuator states. In one embodiment, the actuator states include an actuator ON time parameter, an actuator OFF time parameter, an actuator active time parameter, and an actuator current state parameter. In one embodiment, the actuator ON duration as indicated by the encoded value is copied to the actuator ON time parameter. In one embodiment, the actuator OFF parameter is set as a difference between a pulse duration of a pulse and the actuator ON time parameter.

In one embodiment, when the actuator current state parameter is OFF and a previous encoded value is less than the encoded value, the actuator current state parameter is changed to ON and the actuator active time parameter is reset. In one embodiment, when the actuator current state parameter is ON and a previous encoded value is greater than the encoded value, the actuator current state parameter is changed to OFF and the actuator active time parameter is reset.

In one embodiment, the converting of the encoded value into the pattern of ON/OFF durations includes calling an update function every millisecond. In one embodiment, the update function increments the actuator active time parameter. In one embodiment, the update function compares the actuator active time parameter with a required state time.

In one embodiment, when the actuator current state parameter is ON, the update function compares the actuator active time parameter with the actuator ON time parameter, and if the actuator active time parameter is greater than the actuator ON time parameter, resets the actuator active time parameter and changes the actuator current state parameter to OFF.

In one embodiment, when the actuator current state parameter is OFF, the update function compares the actuator active time parameter with the actuator OFF time parameter, and if the actuator active time parameter is greater than the actuator OFF time parameter, resets the actuator active time parameter and changes the actuator current state parameter to ON.

As disclosed, embodiments allow for real-time haptics generation. One embodiment uses an ON/OFF control API such as the Android vibrate API, and implements PWM functionality to provide fine-grain control over the actuators to render high-fidelity haptic functionality.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide haptic feedback by performing operations comprising:

receiving, at a user device, an input signal from a remote location, wherein the input signal includes an encoded value that encodes an actuator drive value, wherein the actuator drive value corresponds to a strength of a haptic effect;

converting, at the user device, the encoded value into a pattern of ON/OFF durations; and playing back the pattern of ON/OFF durations on an actuator in the user device to produce the haptic effect.

2. The computer readable medium of claim 1, wherein the actuator drive value is provided by a design tool on a workstation, wherein the encoded value is obtained at the workstation, wherein the user device communicates with the workstation and operates the actuator.

3. The computer readable medium of claim 1, wherein the encoded value is obtained by using the actuator drive value to modulate a pulse width of a pulse, wherein the encoded value is indicative of an actuator ON duration.

4. The computer readable medium of claim 3, wherein a pulse period of the pulse is selected according to characteristics of the actuator.

5. The computer readable medium of claim 3, wherein the operations further comprise:
determining a pulse period of the pulse.

6. The computer readable medium of claim 1, wherein the playing back is performed by providing the pattern of ON/OFF durations to an Android vibrate application programming interface (API).

7. The computer readable medium of claim 1, wherein the converting of the encoded value into the pattern of ON/OFF durations includes tracking a state of the actuator over time.

8. The computer readable medium of claim 7, wherein the state of the actuator over time includes one or more of an actuator ON time parameter, an actuator OFF time parameter, an actuator active time parameter, or an actuator current state parameter.

9. The computer readable medium of claim 8, wherein an actuator ON duration as indicated by the encoded value is copied to the actuator ON time parameter.

10. The computer readable medium of claim 8, wherein an actuator OFF parameter is set as a difference between a pulse duration of a pulse and the actuator ON time parameter.

11. The computer readable medium of claim 8, wherein, when the actuator current state parameter is OFF and a previous encoded value is less than the encoded value, the actuator current state parameter is changed to ON and the actuator active time parameter is reset.

12. The computer readable medium of claim 8, wherein, when the actuator current state parameter is ON and a previous encoded value is greater than the encoded value, the actuator current state parameter is changed to OFF and the actuator active time parameter is reset.

13. The computer readable medium of claim 8, wherein the converting of the encoded value into the pattern of ON/OFF durations includes performing an update function every millisecond.

14. The computer readable medium of claim 13, wherein the update function increments the actuator active time parameter.

15. The computer readable medium of claim 14, wherein the update function compares the actuator active time parameter with a required state time.

16. The computer readable medium of claim 15, wherein, when the actuator current state parameter is ON, the update function compares the actuator active time parameter with the actuator ON time parameter, and if the actuator active time parameter is greater than the actuator ON time parameter, resets the actuator active time parameter and changes the actuator current state parameter to OFF.

17. The computer readable medium of claim 15, wherein, when the actuator current state parameter is OFF, the update function compares the actuator active time parameter with the actuator OFF time parameter, and if the actuator active time parameter is greater than the actuator OFF time parameter, resets the actuator active time parameter and changes the actuator current state parameter to ON.

18. A method for providing haptic feedback, the method comprising:
- receiving, at a user device, an input signal from a remote location, wherein the input signal includes an encoded value that encodes an actuator drive value, wherein the actuator drive value corresponds to a strength of a haptic effect;
- converting, at the user device, the encoded value into a pattern of ON/OFF durations; and
- playing back the pattern of ON/OFF durations on an actuator in the user device to produce the haptic effect.

19. The method of claim 18, wherein the actuator drive value is provided by a design tool on a workstation, wherein the encoded value is obtained at the workstation, wherein the user device communicates with the workstation and operates the actuator.

20. A system for providing haptic feedback, the system comprising:
- a processor; and
- memory storing instructions that, when executed by the processor, cause the processor to perform operations including
  - receiving, at a user device, an input signal from a remote location, wherein the input signal includes an encoded value that encodes an actuator drive value, wherein the actuator drive value corresponds to a strength of a haptic effect;
  - converting, at the user device, the encoded value into a pattern of ON/OFF durations; and
  - playing back the pattern of ON/OFF durations on an actuator in the user device to produce the haptic effect.

* * * * *